United States Patent
Pan et al.

(10) Patent No.: US 11,796,901 B2
(45) Date of Patent: Oct. 24, 2023

(54) ILLUMINATION SYSTEM AND PROJECTION DEVICE

(71) Applicant: Coretronic Corporation, Hsin-Chu (TW)

(72) Inventors: Haw-Woei Pan, Hsin-Chu (TW); Yi-Hsuang Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 45 days.

(21) Appl. No.: 17/537,514

(22) Filed: Nov. 30, 2021

(65) Prior Publication Data

US 2022/0197121 A1 Jun. 23, 2022

(30) Foreign Application Priority Data

Dec. 18, 2020 (CN) .......................... 202011506931.0

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01)

(58) Field of Classification Search
CPC .............. G03B 21/204; G03B 21/2066; G03B 21/2033; G03B 21/206; G03B 21/208; G02B 26/008
See application file for complete search history.

(56) References Cited

U.S. PATENT DOCUMENTS

| 10,630,945 | B2* | 4/2020 | Pan | G03B 21/142 |
| 11,506,962 | B2* | 11/2022 | Liao | H04N 9/3105 |
| 2013/0100419 | A1 | 4/2013 | Kim et al. | |
| 2014/0340649 | A1* | 11/2014 | Takahashi | G03B 33/04 353/31 |

(Continued)

FOREIGN PATENT DOCUMENTS

| CN | 108073021 | 5/2018 |
| CN | 104820334 | 6/2018 |

(Continued)

OTHER PUBLICATIONS

"Office Action of China Counterpart Application", dated Dec. 28, 2022, p. 1-p. 12.

*Primary Examiner* — Magda Cruz
(74) *Attorney, Agent, or Firm* — JCIPRNET (57) ABSTRACT

An illumination system adapted to provide an illumination light beam is provided. At a first timing, after an excitation light beam is reflected by a non-conversion reflecting region of a wavelength conversion wheel, the excitation light beam passes through a light splitting element, and is then reflected by a reflecting element, passes through the light splitting element a first lens group and a light uniformizing element in sequence, so as to output a first color light. At a second timing, a converted light beam is converted and reflected by a wavelength conversion reflecting region. A central axis of the excitation light beam reflected by the reflecting element and passing through the light splitting element and a central axis of the converted light beam reflected by the light splitting element are coincided with an optical axis of the first lens group. A projection device is also provided.

16 Claims, 5 Drawing Sheets

(56) References Cited

U.S. PATENT DOCUMENTS

| | | |
|---|---|---|
| 2016/0373705 A1 | 12/2016 | Hashizume |
| 2018/0284586 A1* | 10/2018 | Yang .................. G02B 27/0955 |
| 2019/0155135 A1 | 5/2019 | Imae et al. |
| 2019/0227416 A1* | 7/2019 | Pan ..................... G03B 21/2013 |
| 2019/0227418 A1* | 7/2019 | Chang .................. G03B 21/142 |
| 2020/0159101 A1 | 5/2020 | Fan et al. |
| 2021/0294200 A1* | 9/2021 | Pan ...................... H04N 9/3164 |

FOREIGN PATENT DOCUMENTS

| | | |
|---|---|---|
| CN | 207457687 | 6/2018 |
| CN | 108572497 | 9/2018 |
| CN | 207937747 | 10/2018 |
| CN | 109557750 | 4/2019 |
| CN | 110058479 | 7/2019 |
| CN | 111190322 | 5/2020 |
| JP | 2019061237 | 4/2019 |
| TW | I639035 | 10/2018 |

* cited by examiner

FIG. 2B ic the field, and particular relates to an illumination system and
ILLUMINATION SYSTEM AND PROJECTION DEVICE

CROSS-REFERENCE TO RELATED APPLICATION

This application claims the priority benefit of China Application No. 202011506931.0, filed on Dec. 18, 2020. The entirety of the above-mentioned patent application is hereby incorporated by reference herein and made a part of this specification.

BACKGROUND

Technical Field

The invention relates to an optical system and an optical device, and particularly relates to an illumination system and a projection device.

Description of Related Art

Projection device is a mature product. Along with the evolution and innovation of technology, the projection device has been continuously improved. Due to the high cost of a high-brightness green laser, the current projection device mainly adopts a blue light source to excite phosphor powder on a wavelength conversion wheel to generate yellow-green light, and then a color filter wheel is configured to filter and obtain the required red or green light. In collaboration with the blue light generated by the blue light source, the three primary colors of red, green, and blue for constituting a projection image are obtained.

Generally, an optical framework of the projection device is based on a blue light path. After the blue light is emitted from an excitation light source, it sequentially passes through an optical element to enter the wavelength conversion wheel obliquely, and then exits the wavelength conversion wheel obliquely, and finally enters a light uniformizing element obliquely through an optical element. However, in inspection of a projection effect, it is found that the color uniformity of the projection image is poor when the blue light enters the light uniformizing element in an "asymmetric" angle.

Therefore, an ameliorated projection device has been developed, where an optical element reflecting the blue light on the light path is ameliorated to have a first region and a second region, in which the first region is a blue light transmitting region, and the second region is a blue light transflective region. A reflecting mirror is added to the light path so that the blue light may enter the light uniformizing element at a symmetrical angle. Although the blue light may enter the light uniformizing element of the ameliorated projection device at the symmetrical angle, the angles of the blue light incident to the light uniformizing element in a horizontal direction and a vertical direction are different, which results in a poor color uniformity performance of the projection image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an illumination system and a projection device, in which each color light is incident to a light uniformizing element at a same angle in different directions.

An embodiment of the invention provides an illumination system for providing an illumination light beam. The illumination system includes an excitation light source, a light splitting element, a first lens group, a wavelength conversion wheel, a reflecting element and a light uniformizing element. The excitation light source is configured to emit an excitation light beam. The wavelength conversion wheel has a non-conversion reflecting region and a wavelength conversion reflecting region. At a first timing, the non-conversion reflecting region of the wavelength conversion wheel cuts into a transmission path of the excitation light beam. The excitation light beam passes through the light splitting element and is transmitted to the wavelength conversion wheel. After the excitation light beam is reflected by the non-conversion reflecting region of the wavelength conversion wheel, the excitation light beam passes through the light splitting element, and is then reflected by the reflecting element, passes through the light splitting element, passes through the first lens group, and enters the light uniformizing element in sequence, so that the illumination system outputs a first color light of the illumination light beam. At a second timing, the wavelength conversion reflecting region of the wavelength conversion wheel cuts into the transmission path of the excitation light beam. The excitation light beam passes through the light splitting element and is transmitted to the wavelength conversion wheel. After the wavelength conversion reflecting region of the wavelength conversion wheel converts the excitation light beam into a converted light beam and the converted light beam is reflected by the wavelength conversion reflecting region, the converted light beam is reflected by the light splitting element, passes through the first lens group, and enters the light uniformizing element in sequence, so that the illumination system outputs a second color light of the illumination light beam. A central axis of the excitation light beam reflected by the reflecting element and passing through the light splitting element and a central axis of the converted light beam reflected by the light splitting element are coincided with an optical axis of the first lens group and incident to a light incident surface of the light uniformizing element.

An embodiment of the invention provides a projection device, which includes an illumination system, at least one light valve, and a projection lens. The illumination system is configured to provide an illumination light beam. The light valve is disposed on a transmission path of the illumination light beam to convert the illumination light beam into an image light beam. The projection lens is disposed on a transmission path of the image light beam for projecting the image light beam out of the projection device. The illumination system includes an excitation light source, a light splitting element, a first lens group, a wavelength conversion wheel, a reflecting element and a light uniformizing element. The excitation light source is configured to emit an excitation light beam. The wavelength conversion wheel has a non-conversion reflecting region and a wavelength conversion reflecting region. At a first timing, the non-conversion reflecting region of the wavelength conversion wheel cuts into a transmission path of the excitation light beam. The excitation light beam passes through the light splitting element and is transmitted to the wavelength conversion wheel. After the excitation light beam is reflected by the non-conversion reflecting region of the wavelength conversion wheel, the excitation light beam passes through the light splitting element, and is then reflected by the reflecting element, passes through the light splitting element, passes through the first lens group, and enters the light uniformizing element in sequence, so that the illumination system outputs a first color light of the illumination light beam. At a second timing, the wavelength conversion reflecting region of the wavelength conversion wheel cuts into the transmission path of the excitation light beam. The excitation light beam passes through the light splitting element and is transmitted to the wavelength conversion wheel. After the wavelength conversion reflecting region of the wavelength conversion wheel converts the excitation light beam into a converted light beam and the converted light beam is reflected by the wavelength conversion reflecting region, the converted light beam is reflected by the light splitting element, passes through the first lens group, and enters the light uniformizing element in sequence, so that the illumination system outputs a second color light of the illumination light beam. A central axis of the excitation light beam reflected by the reflecting element and passing through the light splitting element and a central axis of the converted light beam reflected by the light splitting element are coincided with an optical axis of the first lens group and incident to a light incident surface of the light uniformizing element.

Based on the above description, in the illumination system and the projection device of the embodiment of the invention, since the first central axis of the excitation light beam reflected by the reflecting element and passing through the light splitting element and the central axis of the converted light beam reflected by the light splitting element are coincided with the optical axis of the first lens group and incident to the light incident surface of the light uniformizing element, each color light of the illumination light beam may be incident to the light uniformizing element at the same angle in different directions.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
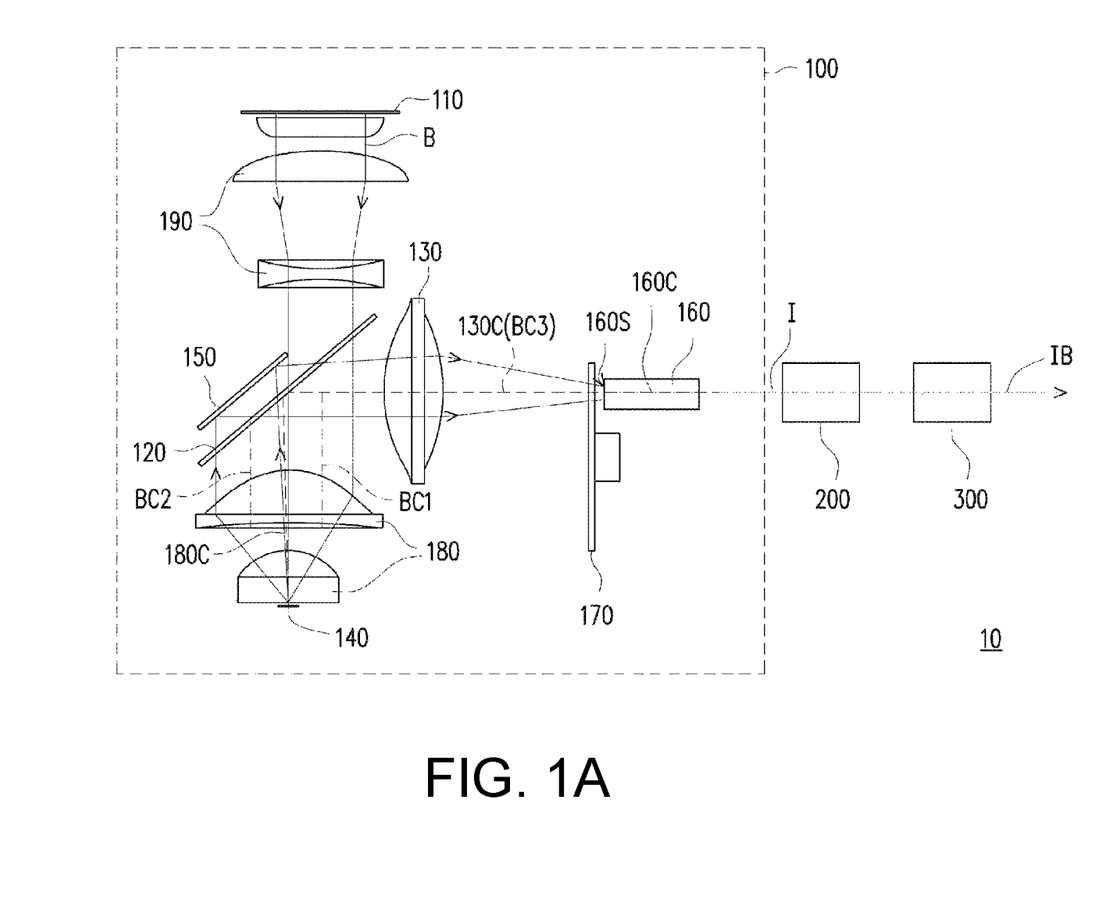
FIG. 1A is a schematic diagram of a light path of a projection device in a first timing according to an embodiment of the invention.

FIG. 1A is a schematic diagram of a light path of a projection device in a first timing according to an embodiment of the invention. Referring to FIG. 1A, an embodiment of the invention provides a projection device 10, which includes an illumination system 100, at least one light valve 200 and a projection lens 300. The illumination system 100 is configured to provide an illumination light beam I. The light valve 200 is disposed on a transmission path of the illumination light beam I to convert the illumination light beam I into an image light beam IB. The projection lens 300 is disposed on a transmission path of the image light beam IB for projecting the image beam IB out of the projection device 10.

In detail, the light valve 200 of the embodiment is, for example, a spatial light modulator such as a digital micromirror device (DMD), a liquid-crystal-on-silicon panel (LCOS panel), or a liquid crystal panel (LCD), etc. The projection lens 300 is, for example, a combination of one or a plurality of optical lenses with refracting powers. The optical lenses are, for example, various combinations of non-planar lenses such as a biconcave lens, a biconvex lens, a concavo-convex lens, a convexo-concave lens, a planoconvex lens, a plano-concave lens, etc. Patterns and types of the light valve 200 and the projection lens 300 are not limited by the invention.

In the embodiment, the illumination system 100 includes an excitation light source 110, a light splitting element 120, a first lens group 130, a wavelength conversion wheel 140, a reflecting element 150 and a light uniformizing element 160. The light splitting element 120 is disposed between the excitation light source 110 and the wavelength conversion wheel 140, the light splitting element 120 is disposed between the reflecting element 150 and the first lens group 130, and the first lens group 130 is disposed between the light splitting element 120 and the light uniformizing element 160. The excitation light source 110 and the wavelength conversion wheel 140 are respectively arranged on two opposite sides of the illumination system 100, and the light uniformizing element 160 and the reflecting element 150 are arranged on two opposite sides different from that of the excitation light source 110 and the wavelength conversion wheel 140.

In the embodiment, the excitation light source 110 is configured to emit an excitation light beam B. The excitation light source 110 is, for example, a laser diode (LD), a light emitting diode (LED) or other suitable light sources or a combination thereof, which is not limited by the invention. In addition, the excitation light beam B is, for example, blue light, red light, green light or other color light. Furthermore, the light splitting element 120 allows color light with a same light color as that of the excitation light beam B to pass through and reflects color light of other light colors.

In an embodiment, the reflecting element 150 may be a plane mirror, a convex mirror, a concave mirror or a prism. In another embodiment, the reflecting element 150 may be a total reflecting mirror or a white reflecting sheet. When the reflecting element 150 is a total reflecting mirror, light energy utilization efficiency of the projection device 10 is better. When the reflective element 150 is a white reflecting sheet, since the white reflecting sheet is a reflecting sheet with a diffusion effect, uniformity of the light beam generated by the projection device 10 is better.

Figure 1B:
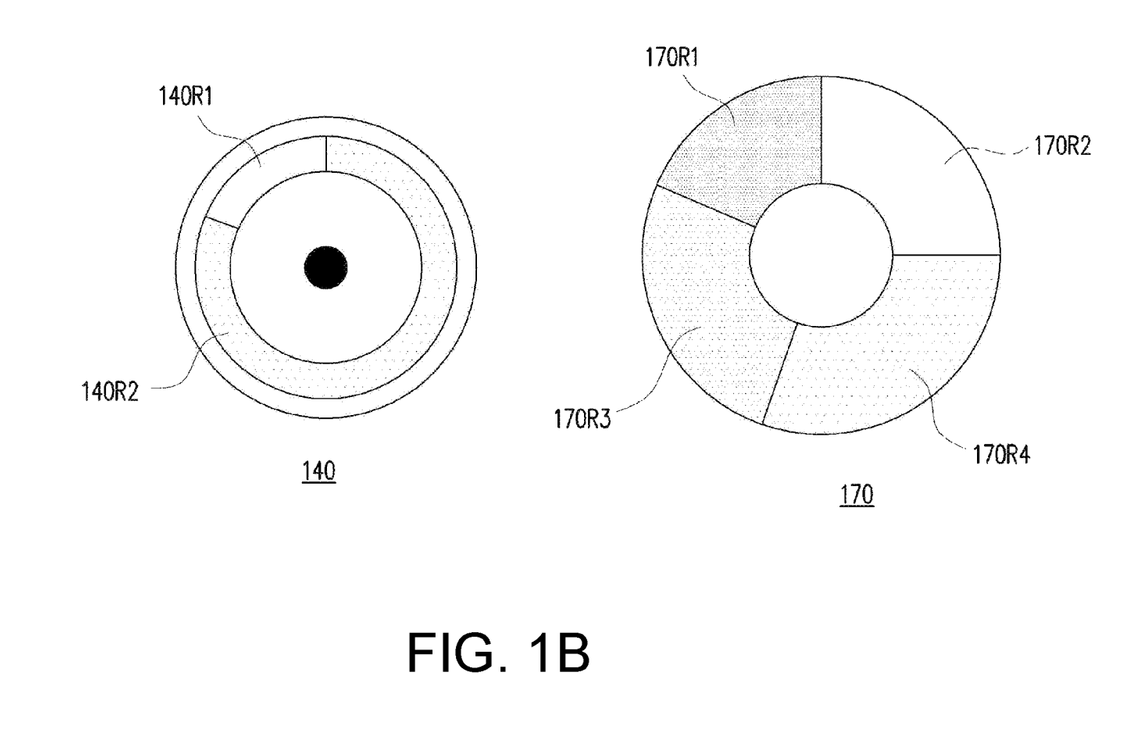
FIG. 1B is a schematic diagram of a wavelength conversion wheel and a color filter wheel of FIG. 1A.
Figure 1C:
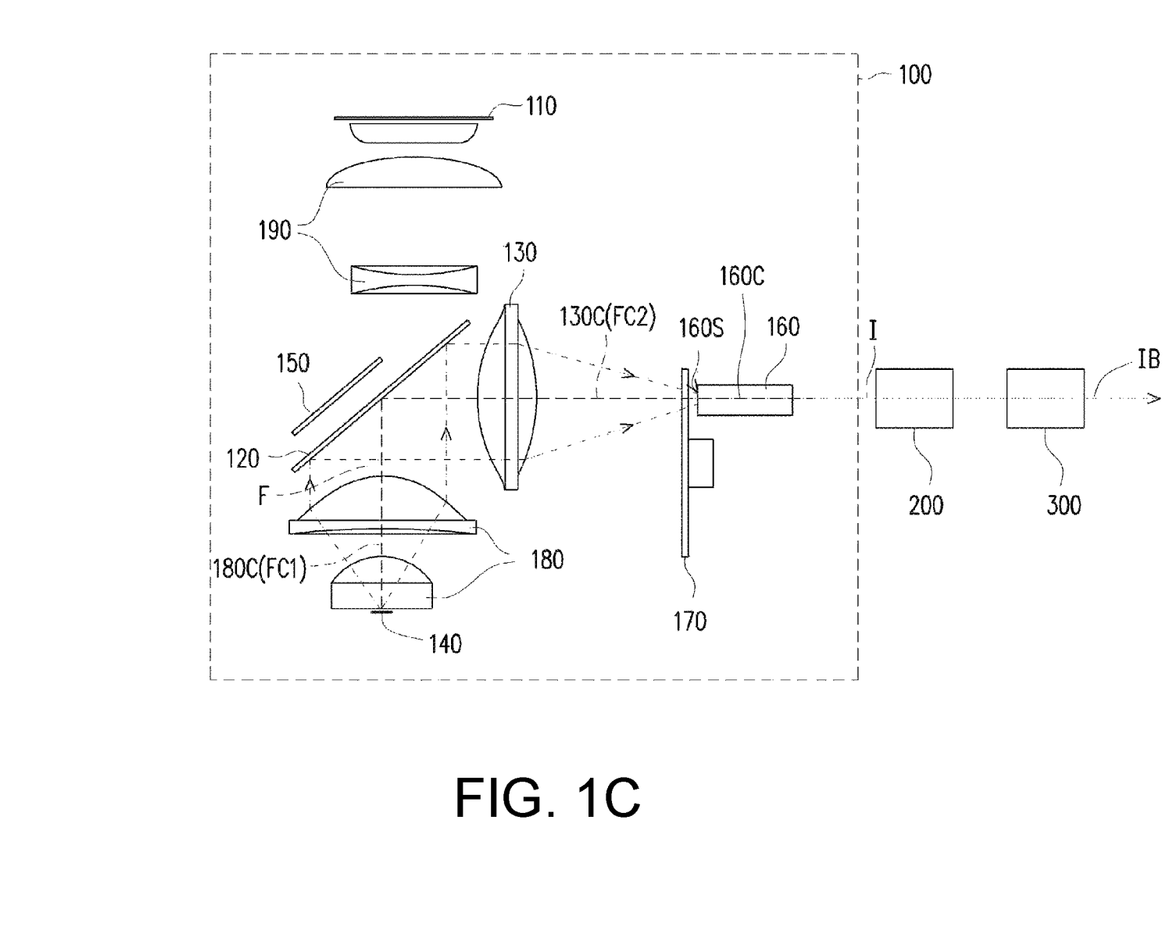
FIG. 1C is a schematic diagram of a light path of a projection device in a second timing according to an embodiment of the invention.

In the embodiment, the light uniformizing element 160 uniformizes the passing light beam (for example, the excitation light beam B in FIG. 1A or the converted light beam F in FIG. 1C). The light uniformizing element 160 is, for example, an integration rod, a lens array or other optical elements with a light uniformizing effect, but the invention is not limited thereto.

FIG. 1B is a schematic diagram of the wavelength conversion wheel and a color filter wheel of FIG. 1A. Referring to FIG. 1A and FIG. 1B at the same time. In the embodiment, the wavelength conversion wheel 140 has a non-conversion reflecting region 140R1 and a wavelength conversion reflecting region 140R2.

At a first timing of the embodiment, the non-conversion reflecting region 140R1 of the wavelength conversion wheel 140 cuts into the transmission path of the excitation light beam B. The excitation light beam B passes through the light splitting element 120 and is then transmitted to the wavelength conversion wheel 140. After the excitation light beam B is reflected by the non-conversion reflecting region 140R1 of the wavelength conversion wheel 140, the excitation light beam B passes through the light splitting element 120, and is then reflected by the reflecting element 150, passes through the light splitting element 120, passes through the first lens group 130, and enters the light uniformizing element 160 in sequence, so that the illumination system 100 outputs a first color light of the illumination light beam I. Namely, a light color of the first color light is the same as a light color of the excitation light beam B.

In the embodiment, the illumination system 100 further includes a second lens group 180. The second lens group 180 is disposed between the light splitting element 120 and the wavelength conversion wheel 140. On the light path of the excitation light beam B transmitted from the light splitting element 120 to the second lens group 180, a central axis BC1 of the excitation light beam B coming from the excitation light source 110 is not coincided with an optical axis 180C of the second lens group 180. In other words, the excitation light beam B is incident to the second lens group 180 in a manner of deviating from the optical axis 180C of the second lens group 180. In the embodiment of FIG. 1A, the excitation beam B passes through the second lens group 180 from a right half of the second lens group 180.

Besides, at the first timing of the embodiment, on the light path where the excitation light beam B reflected by the non-conversion reflecting region 140R1 is transmitted from the second lens group 180 to the light splitting element 120, a central axis BC2 of the excitation light beam B reflected by the non-conversion reflecting region 140R1 is not coincided with the optical axis 180C of the second lens group 180. Namely, the excitation light beam B reflected by the non-conversion reflecting region 140R1 is incident to the light splitting element 120 in a manner of deviating from the optical axis 180C of the second lens group 180. In the embodiment of FIG. 1A, the excitation light beam B reflected by the non-conversion reflecting region 140R1 passes through the second lens group 180 from a left half of the second lens group 180. In addition, on the light path where the excitation light beam B is transmitted from the light splitting element 120 to the light uniformizing element 160, a central axis BC3 of the excitation light beam B is coincided with a central axis 160C of the light uniformizing element 160.

In an embodiment, the illumination system 100 further includes a third lens group 190. The third lens group 190 is disposed between the excitation light source 110 and the light splitting element 120, and is configured to shrink or collimate the excitation light beam B to enter the light splitting element 120.

FIG. 1C is a schematic diagram of a light path of the projection device in a second timing according to an embodiment of the invention. For simplicity's sake, FIG. 1C omits the part of the light path where the excitation light beam B is transmitted from the excitation light source 110 to the wavelength conversion wheel 140. Referring to FIG. 1B and FIG. 1C at the same time, in the second timing of the embodiment, the wavelength conversion reflecting region 140R2 of the wavelength conversion wheel 140 cuts into the transmission path of the excitation light beam B. The excitation light beam B passes through the light splitting element 120 and is transmitted to the wavelength conversion wheel 140. After the wavelength conversion reflecting region 140R2 of the wavelength conversion wheel 140 converts the excitation light beam B into a converted light beam F and the converted light beam F is reflected by the wavelength conversion reflecting region 140R2, the converted light beam F is reflected by the light splitting element 120, passes through the first lens group 130, and enters the light uniformizing element 160 in sequence, so that the illumination system 100 outputs a second color light of the illumination light beam I. Taking a situation that the excitation light beam B is blue light as an example, the wavelength conversion reflecting region 140R2 converts the excitation light beam B into red light or green light or a combination thereof. In other words, the light color of the converted light beam F or the second color light may be red or green or a combination thereof (for example, yellow).

At the second timing of the embodiment, on the light path where the converted light beam F reflected by the wavelength conversion reflecting region 140R2 is transmitted from the wavelength conversion wheel 140 to the second lens group 180, a central axis FC1 of the converted light beam F is coincided with the optical axis 180C of the second lens group 180. In addition, on the light path where the converted light beam F is transmitted from the light splitting element 120 to the light uniformizing element 160, a central axis FC2 of the converted light beam F is coincided with the central axis 160C of the light uniformizing element 160.

Referring to FIG. 1A to FIG. 1C at the same time, in the embodiment, the second lens group 180 shrinks or collimates the excitation light beam B or the converted light beam F coming from the wavelength conversion wheel 140 to enter the light splitting element 120. The first lens group 130 is used to shrink the excitation light beam B or the converted light beam F coming from the light splitting element 120 to enter the light uniformizing element 160. In the embodiment, a central axis BC3 of the excitation light beam B reflected by the reflecting element 150 and passing through the light splitting element 120 and the central axis FC2 of the converted beam F reflected by the light splitting element 120 are coincided with the optical axis 130C of the first lens group 130 and incident to a light incident surface 160S of the light uniformizing element 160.

In the embodiment, the excitation light beam B is incident to the light incident surface 160S at a first incident angle to form a first light spot, the converted light beam F is incident to the light incident surface 160S at a second incident angle to form a second light spot, and a difference between the first incident angle and the second incident angle is less than or equal to 20%. In other words, a difference between incident angles of the excitation light beam B and the converted light beam F incident to the light incident surface 160S of the light uniformizing element 160 is less than or equal to 20%. Therefore, the illumination system 100 and the projection device 10 of an embodiment of the invention have better color uniformity.

In the embodiment, the illumination system 100 or the projection device 10 further includes a color filter wheel 170. The color filter wheel 170 is disposed between the first lens group 130 and the light uniformizing element 160, and has a scattering region 170R1 and non-scattering regions (including 170R2, 170R3, and 170R4).

At the first timing of the embodiment, the scattering region 170R1 of the color filter wheel 170 cuts into the transmission path of the excitation light beam B, and the excitation light beam B passing through the light splitting element 120 first passes through the scattering region 170R1 and then passes through the light uniformizing element 160. In an embodiment, a field angle of the excitation light beam B can be expanded by the scattering region 170R1 of the color filter wheel 170. Therefore, a light spot size of the expanded excitation light beam B and a light spot size of the converted light beam F are substantially the same, and the incident angle of the expanded excitation light beam B on the light incident surface 160S of the light uniformizing element 160 and the incident angle of the converted light beam F on the light incident surface 160S of the light uniformizing element 160 have a difference less than or equal to 20%, or are substantially the same, so that the illumination system 100 and the projection device 10 have better color uniformity.

At the second timing of the embodiment, the non-scattering region of the color filter wheel 170 cuts into the transmission path of the converted light beam F, so that the converted light beam F reflected by the light splitting element 120 first passes through the non-scattering region and then passes through the light uniformizing element 160.

In an embodiment, the non-scattering region of the color filter wheel 170 includes a transparent region 170R2, a first filter region 170R3, and a second filter region 170R4. The second timing includes a first sub-timing, a second sub-timing, and a third sub-timing, and the second color light (for example, yellow light) respectively includes a first sub-color light (for example, red light) and a second sub-color light (for example, green light).

At the first sub-timing, the second sub-timing and the third sub-timing of an embodiment, the first filter region 170R3, the second filter region 170R4, and the transparent region 170R2 of the color filter wheel 170 sequentially cut into the transmission path of the converted light beam F, and the converted light beam F reflected by the light splitting element 120 respectively passes through the first filter region 170R3, the second filter region 170R4, and the transparent region 170R2 at different sub-timings, and then passes through the light uniformizing element 160, so that the illumination system 100 respectively outputs the first sub-color light (for example, red light), the second sub-color light (for example, green light), and the second color light (for example, yellow light) of the illumination light beam I at the second timing.

Based on the above description, in the illumination system 100 and the projection device 10 of an embodiment of the invention, since the illumination system 100 is provided with the reflecting element 150 on the light path of the excitation light beam B, the central axis BC3 of the excitation light beam B reflected by the reflecting element 150 and passing through the light splitting element 120 and the central axis FC2 of the converted beam F reflected by the light splitting element 120 are coincided with the optical axis 130C of the first lens group 130 and incident to the light incident surface 160S of the light uniformizing element 160. Therefore, light spots of various color light of the illumination light beam I are circularly symmetric, so that the illumination system 100 provides the illumination light beam I with better color uniformity, and the projection image of the projection device 10 has better color uniformity performance. In addition, the light splitting element 120 does not need to split light by zones, but is simplified to allow the color light with the same light color as that of the excitation light beam B to pass through and reflect the color light of other light colors, which helps to reduce the cost of the illumination system 100 and the projection device 10.

Figure 2A:
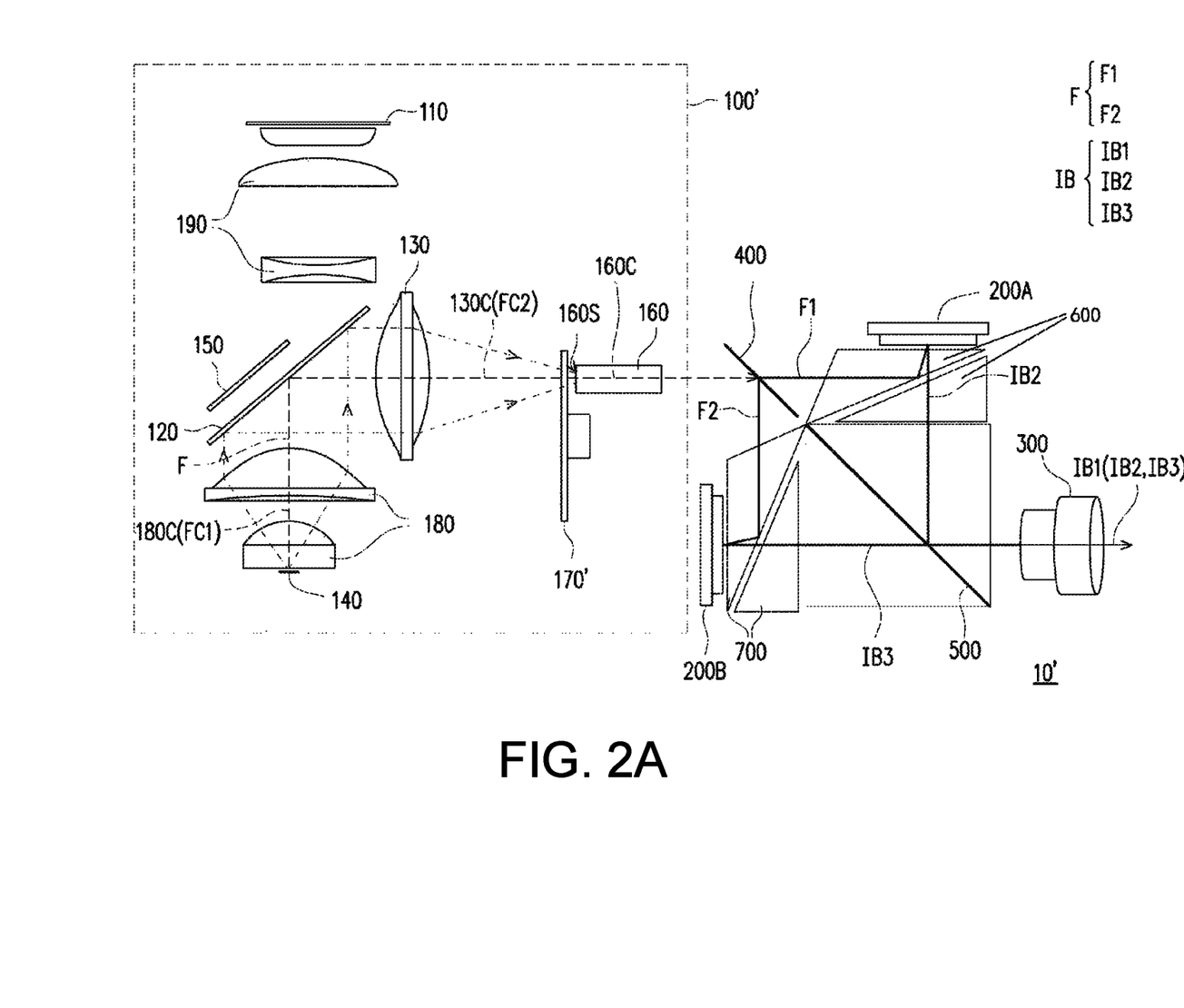
FIG. 2A is a schematic diagram of a projection device according to another embodiment of the invention.

FIG. 2A is a schematic diagram of a projection device according to another embodiment of the invention. Referring to FIG. 2A, a projection device 10' of FIG. 2A is similar to the projection device 10 of FIG. 1C, and a main difference there between is that the projection device 10' further includes a dichroic element 400, and at least one light valve includes a first light valve 200A and a second light valve 200B. In the embodiment, the light uniformizing element 160 is disposed between the color filter wheel 170' and the dichroic element 400.

In detail, the converted light beam F of the embodiment includes a first converted light beam F1 serving as the first sub-color light and a second converted light beam F2 serving as the second sub-color light, where the first sub-color light may be red light and the second sub-color light may be green light. The image light beam IB includes a first sub-image light beam IB1, a second sub-image light beam IB2, and a third sub-image light beam IB3. In the embodiment, the dichroic element 400 is arranged on the transmission path of the illumination light beam I. The dichroic element 400 is used to allow the first converted light beam F1 to pass through, reflect the second converted light beam F2, and allow the excitation light beam B to pass through or be reflected.

At the first timing of the embodiment, the excitation light beam B passing through the light uniformizing element 160 is transmitted to one of the first light valve 200A and the second light valve 200B through the dichroic element 400, and the excitation light beam B is converted into the first sub-image light beam IB1.

At the second timing of the embodiment, the first converted light beam F1 of the converted light beam F that passes through the light uniformizing element 160 passes through the dichroic element 400 and is then transmitted to the first light valve 200A, so that the first converted light beam F1 is converted into the second sub-image light beam IB2. The second converted light beam F2 of the converted light beam F that passes through the light uniformizing element 160 is reflected to the second light valve 200B by the dichroic element 400, so that the second converted light beam F2 is converted into the third sub-image light beam IB3.

In the embodiment, the projection device 10' further includes a dichroic element 500 and prism groups 600 and 700. The dichroic element 500 is arranged on transmission paths of the first sub-image light beam IB1, the second sub-image light beam IB2 and the third sub-image light beam IB3. The dichroic element 500 is used for reflecting the second sub-image light beam IB2, allowing the third sub-image light beam IB3 to pass through, and allowing the first sub-image light beam IB1 to pass through or be reflected. In addition, the prism groups 600 and 700 may be total internal reflection (TIR) prisms. The prism group 600 is disposed between the first light valve 200A and the dichroic element 500. The prism group 600 reflects the first converted light beam F1 coming from the dichroic element 400 to the first light valve 200A, and allows the second sub-image light beam IB2 coming from the first light valve 200A to pass through. The prism group 700 is disposed between the second light valve 200B and the dichroic element 500. The prism group 700 reflects the second converted light beam F2 coming from the dichroic element 400 to the second light valve 200B, and allows the third sub-image light beam IB3 coming from the second light valve 200B to pass through.

Figure 2B:
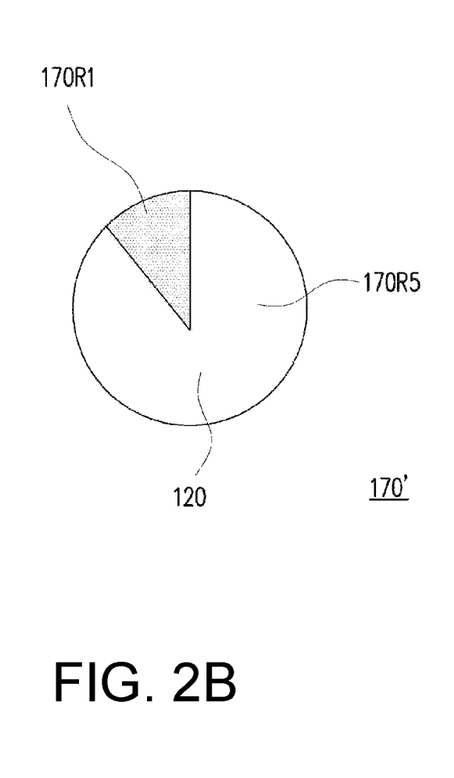
FIG. 2B is a schematic diagram of a color filter wheel of FIG. 2A.

FIG. 2B is a schematic diagram of a color filter wheel of FIG. 2A. Referring to 2A and 2B at the same time, in the embodiment, the non-scattering region 170R5 of the color filter wheel 170' of the illumination system 100' or the projection device 10' is a light transmitting region. The excitation light beam B passing through the light splitting element 120 first passes through the scattering region 170R1 of the color filter wheel 170' and then passes through the light uniformizing element 160. A field angle of the excitation light beam B may be expanded by the scattering region 170R1 of the color filter wheel 170'. A light spot size of the expanded excitation light beam B and a light spot size of the converted light beam F passing through the non-scattering region (light transmitting region) 170R5 of the color filter wheel 170' are substantially the same, and the incident angle of the expanded excitation light beam B on the light incident surface 160S of the light uniformizing element 160 and the incident angle of the converted light beam F on the light incident surface 160S of the light uniformizing element 160 have a difference less than or equal to 20%, or are substantially the same.

Based on the above description, in the projection device 10' of an embodiment of the invention, since the projection device 10' is provided with the first light valve 200A and the second light valve 200B, the first light valve 200A and the second light valve 200B may simultaneously perform an image conversion operation, i.e., the first sub-timing, the second sub-timing and the third sub-timing described above may be executed at the same time, so that an idle time of the first light valve 200A or the second light valve 200B is reduced, and therefore, the use efficiency of the projection device 10' is effectively improved.

In summary, in the illumination system and the projection device of the embodiment of the invention, since the central axis of the excitation light beam reflected by the reflecting element and passing through the light splitting element and the central axis of the converted light beam reflected by the light splitting element are coincided with the optical axis of the first lens group and incident to the light incident surface of the light uniformizing element, and the field angle of the excitation light beam may be expanded by the scattering region of the color filter wheel, and the light spot size of the expanded excitation light beam and the light spot size of the converted light beam passing through the non-scattering region of the color filter wheel are substantially the same, each color light may be incident to the light uniformizing element at the same angle in different directions, so that the illumination system may provide the illumination light beam with better color uniformity, and the projection image of the projection device has better color uniformity performance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination light beam, and comprising an excitation light source, a light splitting element, a first lens group, a wavelength conversion wheel, a reflecting element, and a light uniformizing element, wherein:
   the excitation light source is configured to emit an excitation light beam;
   the wavelength conversion wheel comprises a non-conversion reflecting region and a wavelength conversion reflecting region;
   at a first timing, the non-conversion reflecting region of the wavelength conversion wheel cuts into a transmission path of the excitation light beam, the excitation light beam passes through the light splitting element and is transmitted to the wavelength conversion wheel, after the excitation light beam is reflected by the non-conversion reflecting region of the wavelength conversion wheel, the excitation light beam passes through the light splitting element, and is then reflected by the reflecting element, passes through the light splitting element, passes through the first lens group, and enters the light uniformizing element in sequence, so that the illumination system outputs a first color light of the illumination light beam;
   at a second timing, the wavelength conversion reflecting region of the wavelength conversion wheel cuts into the transmission path of the excitation light beam, the excitation light beam passes through the light splitting element and is transmitted to the wavelength conversion wheel, after the wavelength conversion reflecting region of the wavelength conversion wheel converts the excitation light beam into a converted light beam and the converted light beam is reflected by the wavelength conversion reflecting region, the converted light beam is reflected by the light splitting element, passes through the first lens group, and enters the light uniformizing element in sequence, so that the illumination system outputs a second color light of the illumination light beam; and
   a central axis of the excitation light beam reflected by the reflecting element and passing through the light splitting element and a central axis of the converted light beam reflected by the light splitting element are coincided with an optical axis of the first lens group and incident to a light incident surface of the light uniformizing element,
   wherein the excitation light beam is incident to the light incident surface at a first incident angle to form a first light spot, the converted light beam is incident to the light incident surface at a second incident angle to form a second light spot, and a difference between the first incident angle and the second incident angle is less than or equal to 20%, and the first light spot of the excitation light beam formed on the light incident surface of the light uniformizing element is circularly symmetric.

2. The illumination system as claimed in claim 1, wherein the illumination system further comprises a second lens group, the second lens group is disposed between the light splitting element and the wavelength conversion wheel, and on a light path where the excitation light beam is transmitted from the light splitting element to the second lens group, the central axis of the excitation light beam is not coincided with an optical axis of the second lens group.

3. The illumination system as claimed in claim 2, wherein
   at the first timing, on a light path where the excitation light beam reflected by the non-conversion reflecting region is transmitted from the second lens group to the light splitting element, the central axis of the excitation light beam is not coincided with the optical axis of the second lens group;
   at the second timing, on a light path where the converted light beam reflected by the wavelength conversion reflecting region is transmitted from the wavelength conversion wheel to the second lens group, the central axis of the converted light beam is coincided with the optical axis of the second lens group.

4. The illumination system as claimed in claim 1, wherein at the first timing, on a light path where the excitation light beam is transmitted from the light splitting element to the light uniformizing element, the central axis of the excitation light beam is coincided with a central axis of the light uniformizing element.

5. The illumination system as claimed in claim 1, wherein at the second timing, on a light path where the converted light beam is transmitted from the light splitting element to the light uniformizing element, the central axis of the converted light beam is coincided with a central axis of the light uniformizing element.

6. An illumination system, configured to provide an illumination light beam, and comprising an excitation light source, a light splitting element, a first lens group, a wavelength conversion wheel, a reflecting element, a light uniformizing element, and a color filter wheel, wherein:
   the excitation light source is configured to emit an excitation light beam;
   the wavelength conversion wheel comprises a non-conversion reflecting region and a wavelength conversion reflecting region;
   at a first timing, the non-conversion reflecting region of the wavelength conversion wheel cuts into a transmission path of the excitation light beam, the excitation light beam passes through the light splitting element and is transmitted to the wavelength conversion wheel, after the excitation light beam is reflected by the non-conversion reflecting region of the wavelength conversion wheel, the excitation light beam passes through the light splitting element, and is then reflected by the reflecting element, passes through the light splitting element, passes through the first lens group, and enters the light uniformizing element in sequence, so that the illumination system outputs a first color light of the illumination light beam;
   at a second timing, the wavelength conversion reflecting region of the wavelength conversion wheel cuts into the transmission path of the excitation light beam, the excitation light beam passes through the light splitting element and is transmitted to the wavelength conversion wheel, after the wavelength conversion reflecting region of the wavelength conversion wheel converts the excitation light beam into a converted light beam and the converted light beam is reflected by the wavelength conversion reflecting region, the converted light beam is reflected by the light splitting element, passes through the first lens group, and enters the light uniformizing element in sequence, so that the illumination system outputs a second color light of the illumination light beam;

a central axis of the excitation light beam reflected by the reflecting element and passing through the light splitting element and a central axis of the converted light beam reflected by the light splitting element are coincided with an optical axis of the first lens group and incident to a light incident surface of the light uniformizing element;

the color filter wheel is disposed between the first lens group and the light uniformizing element, and comprising a scattering region and a non-scattering region, wherein:

at the first timing, the scattering region of the color filter wheel cuts into the transmission path of the excitation light beam, and the excitation light beam passing through the light splitting element first passes through the scattering region and then passes through the light uniformizing element;

at the second timing, the non-scattering region of the color filter wheel cuts into a transmission path of the converted light beam, and the converted light beam reflected by the light splitting element first passes through the non-scattering region and then passes through the light uniformizing element; and wherein the non-scattering region of the color filter wheel comprises a transparent region, a first filter region, and a second filter region, the second timing comprises a first sub-timing, a second sub-timing, and a third sub-timing, and the second color light respectively comprises a first sub-color light and a second sub-color light; at the first sub-timing, the second sub-timing, and the third sub-timing, the first filter region, the second filter region, and the transparent region of the color filter wheel respectively cut into the transmission path of the converted light beam, and the converted light beam reflected by the light splitting element respectively passes through the first filter region, the second filter region, and the transparent region, and then passes through the light uniformizing element, so that the illumination system respectively outputs the first sub-color light, the second sub-color light, and the second color light of the illumination light beam.

7. The illumination system as claimed in claim 6, wherein at the first timing, a field angle of the excitation light beam is expanded by the scattering region of the color filter wheel.

8. A projection device, comprising an illumination system, at least one light valve, and a projection lens, wherein: the illumination system is configured to provide an illumination light beam; the at least one light valve is disposed on a transmission path of the illumination light beam to convert the illumination light beam into an image light beam; and the projection lens is disposed on a transmission path of the image light beam for projecting the image light beam out of the projection device, wherein the illumination system comprises an excitation light source, a light splitting element, a first lens group, a wavelength conversion wheel, a reflecting element, and a light uniformizing element, wherein:

the excitation light source is configured to emit an excitation light beam;

the wavelength conversion wheel comprises a non-conversion reflecting region and a wavelength conversion reflecting region;

at a first timing, the non-conversion reflecting region of the wavelength conversion wheel cuts into a transmission path of the excitation light beam, the excitation light beam passes through the light splitting element and is transmitted to the wavelength conversion wheel, after the excitation light beam is reflected by the non-conversion reflecting region of the wavelength conversion wheel, the excitation light beam passes through the light splitting element, and is then reflected by the reflecting element, passes through the light splitting element, passes through the first lens group, and enters the light uniformizing element in sequence, so that the illumination system outputs a first color light of the illumination light beam;

at a second timing, the wavelength conversion reflecting region of the wavelength conversion wheel cuts into the transmission path of the excitation light beam, the excitation light beam passes through the light splitting element and is transmitted to the wavelength conversion wheel, after the wavelength conversion reflecting region of the wavelength conversion wheel converts the excitation light beam into a converted light beam and the converted light beam is reflected by the wavelength conversion reflecting region, the converted light beam is reflected by the light splitting element, passes through the first lens group, and enters the light uniformizing element in sequence, so that the illumination system outputs a second color light of the illumination light beam; and a central axis of the excitation light beam reflected by the reflecting element and passing through the light splitting element and a central axis of the converted light beam reflected by the light splitting element are coincided with an optical axis of the first lens group and incident to a light incident surface of the light uniformizing element, wherein the excitation light beam is respectively incident to the light incident surface at a first incident angle to form a first light spot, the converted light beam is incident to the light incident surface at a second incident angle to form a second light spot, and a difference between the first incident angle and the second incident angle is less than or equal to 20%, and the first light spot of the excitation light beam formed on the light incident surface of the light uniformizing element is circularly symmetric.

9. The projection device as claimed in claim 8, wherein the illumination system further comprises a second lens group, the second lens group is disposed between the light splitting element and the wavelength conversion wheel, and on a light path where the excitation light beam is transmitted from the light splitting element to the second lens group, the central axis of the excitation light beam is not coincided with an optical axis of the second lens group.

10. The projection device as claimed in claim 9, wherein at the first timing, on a light path where the excitation light beam reflected by the non-conversion reflecting region is transmitted from the second lens group to the light splitting element, the central axis of the excitation light beam is not coincided with the optical axis of the second lens group;

at the second timing, on a light path where the converted light beam reflected by the wavelength conversion reflecting region is transmitted from the wavelength conversion wheel to the second lens group, the central axis of the converted light beam is coincided with the optical axis of the second lens group.

11. The projection device as claimed in claim 8, wherein at the first timing, on a light path where the excitation light beam is transmitted from the light splitting element to the light uniformizing element, the central axis of the excitation light beam is coincided with a central axis of the light uniformizing element.

12. The projection device as claimed in claim 8, wherein at the second timing, on a light path where the converted light beam is transmitted from the light splitting element to the light uniformizing element, the central axis of the converted light beam is coincided with a central axis of the light uniformizing element.

13. A projection device, comprising an illumination system, at least one light valve, and a projection lens, wherein: the illumination system is configured to provide an illumination light beam; the at least one light valve is disposed on a transmission path of the illumination light beam to convert the illumination light beam into an image light beam; and the projection lens is disposed on a transmission path of the image light beam for projecting the image light beam out of the projection device, wherein the illumination system comprises an excitation light source, a light splitting element, a first lens group, a wavelength conversion wheel, a reflecting element, and a light uniformizing element, wherein:
the excitation light source is configured to emit an excitation light beam;
the wavelength conversion wheel comprises a non-conversion reflecting region and a wavelength conversion reflecting region;
at a first timing, the non-conversion reflecting region of the wavelength conversion wheel cuts into a transmission path of the excitation light beam, the excitation light beam passes through the light splitting element and is transmitted to the wavelength conversion wheel, after the excitation light beam is reflected by the non-conversion reflecting region of the wavelength conversion wheel, the excitation light beam passes through the light splitting element, and is then reflected by the reflecting element, passes through the light splitting element, passes through the first lens group, and enters the light uniformizing element in sequence, so that the illumination system outputs a first color light of the illumination light beam;
at a second timing, the wavelength conversion reflecting region of the wavelength conversion wheel cuts into the transmission path of the excitation light beam, the excitation light beam passes through the light splitting element and is transmitted to the wavelength conversion wheel, after the wavelength conversion reflecting region of the wavelength conversion wheel converts the excitation light beam into a converted light beam and the converted light beam is reflected by the wavelength conversion reflecting region, the converted light beam is reflected by the light splitting element, passes through the first lens group, and enters the light uniformizing element in sequence, so that the illumination system outputs a second color light of the illumination light beam; and
a central axis of the excitation light beam reflected by the reflecting element and passing through the light splitting element and a central axis of the converted light beam reflected by the light splitting element are coincided with an optical axis of the first lens group and incident to a light incident surface of the light uniformizing element;
the color filter wheel is disposed between the first lens group and the light uniformizing element, and comprising a scattering region and a non-scattering region, wherein:

at the first timing, the scattering region of the color filter wheel cuts into the transmission path of the excitation light beam, and the excitation light beam passing through the light splitting element first passes through the scattering region and then passes through the light uniformizing element;
at the second timing, the non-scattering region of the color filter wheel cuts into a transmission path of the converted light beam, and the converted light beam reflected by the light splitting element first passes through the non-scattering region and then passes through the light uniformizing element; and
wherein the non-scattering region of the color filter wheel comprises a transparent region, a first filter region, and a second filter region, the second timing comprises a first sub-timing, a second sub-timing, and a third sub-timing, and the second color light respectively comprises a first sub-color light and a second sub-color light; at the first sub-timing, the second sub-timing and the third sub-timing, the first filter region, the second filter region, and the transparent region of the color filter wheel respectively cut into the transmission path of the converted light beam, and the converted light beam reflected by the light splitting element respectively passes through the first filter region, the second filter region, and the transparent region, and then passes through the light uniformizing element, so that the illumination system respectively outputs the first sub-color light, the second sub-color light, and the second color light of the illumination light beam.

14. The projection device as claimed in claim 13, wherein at the first timing, a field angle of the excitation light beam is expanded by the scattering region of the color filter wheel.

15. The projection device as claimed in claim 13, wherein the non-scattering region of the color filter wheel is a light transmitting region.

16. The projection device as claimed in claim 15, further comprising a dichroic element, and the at least one light valve comprising a first light valve and a second light valve, wherein:
the light uniformizing element is disposed between the color filter wheel and the dichroic element;
the image light beam comprises a first sub-image light beam, a second sub-image light beam, and a third sub-image light beam;
the converted light beam comprises a first converted light beam with a first sub-color light and a second converted light beam with a second sub-color light;
at the first timing, the excitation light beam passing through the light uniformizing element is transmitted to one of the first light valve and the second light valve through the dichroic element, so that the excitation light beam is converted into the first sub-image light beam;
at the second timing, the first converted light beam of the converted light beam that passes through the light uniformizing element and the dichroic element, and is then transmitted to the first light valve, so that the first converted light beam is converted into the second sub-image light beam, and the second converted light beam of the converted light beam that passes through the light uniformizing element and is reflected to the second light valve by the dichroic element, so that the second converted beam is converted into the third sub-image light beam.

* * * * *